United States Patent [19]

Hellekson et al.

[11] Patent Number: 4,799,164
[45] Date of Patent: Jan. 17, 1989

[54] SHALLOW BAR CODE SCANNER

[75] Inventors: Ronald A. Hellekson, Eugene; Jorge L. Acosta, Veneta, both of Oreg.; John S. Campbell, Palo Alto, Calif.

[73] Assignee: Spectra-Physics, Inc., San Jose, Calif.

[21] Appl. No.: 907,292

[22] Filed: Sep. 12, 1986

[51] Int. Cl.[4] .............................................. G06K 7/10
[52] U.S. Cl. .................................... 235/467; 235/470; 350/3.71; 350/6.2
[58] Field of Search ......................... 350/3.71, 6.2, 6.5, 350/6.6, 6.7, 6.8; 235/454, 462, 463, 467, 470

[56] References Cited

U.S. PATENT DOCUMENTS

| | | | |
|---|---|---|---|
| 3,947,816 | 3/1976 | Rabedeau | 235/467 |
| 3,978,317 | 8/1976 | Yamaguchi et al. | 235/467 |
| 4,093,865 | 6/1978 | Nicki | 235/470 |
| 4,431,912 | 2/1984 | Dickson et al. | 235/463 |
| 4,647,143 | 3/1987 | Yamazaki et al. | 350/3.71 |
| 4,713,532 | 12/1987 | Knowles | 235/470 |

OTHER PUBLICATIONS

Spectra-Physics Model 750F UPC/EAN Scanner, Service Manual.

Primary Examiner—Gerald P. Tolin
Assistant Examiner—Jeffrey A. Gaffin
Attorney, Agent, or Firm—Donald C. Feix; Paul Davis; T. M. Freiburger

[57] ABSTRACT

A compact counter-type bar code scanner produces a "five-apparent-source" scan geometry within an optimum scan volume above the deck of the bar code reader, with a total scanner housing height of less than 13 centimeters, and preferably about 11.5 centimeters. The optics are maximized to achieve approximately the same bar code reading efficiency and reliability as in previous much deeper bar code scanners producing similar scan geometry by reflecting the scanned beam off three surfaces, the last of which is horizontal.

34 Claims, 11 Drawing Sheets

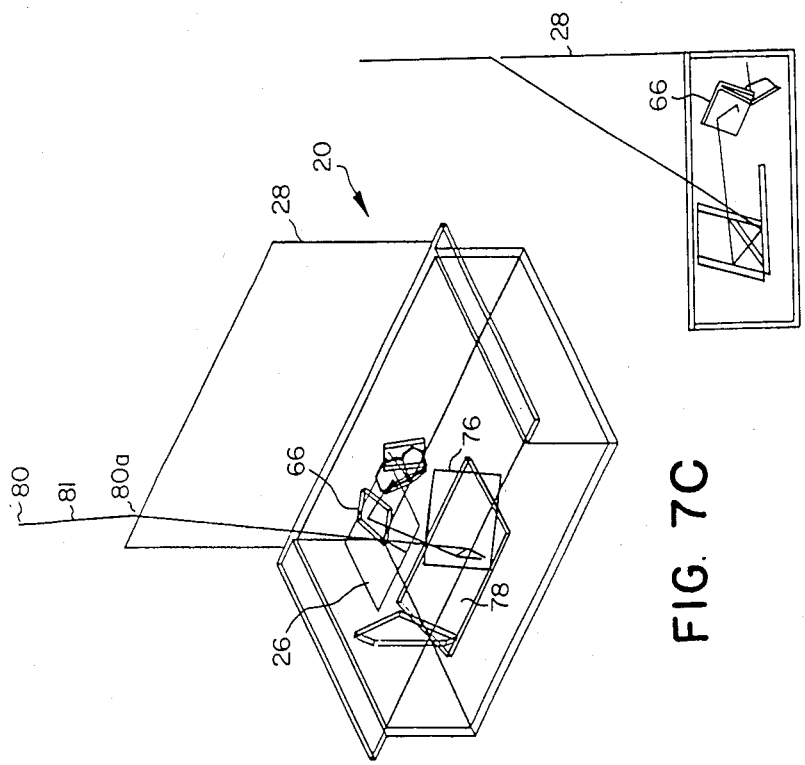
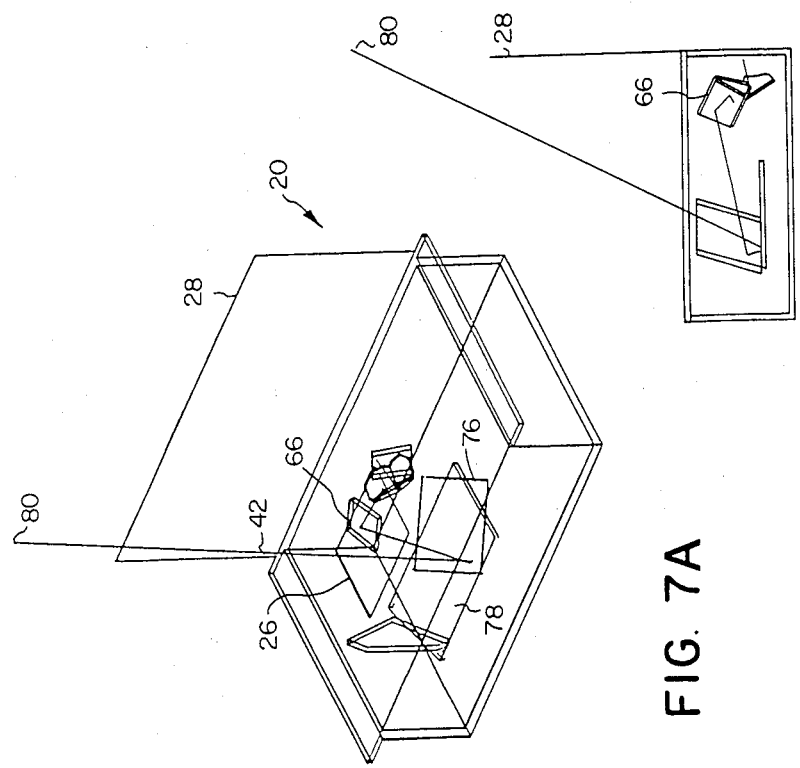

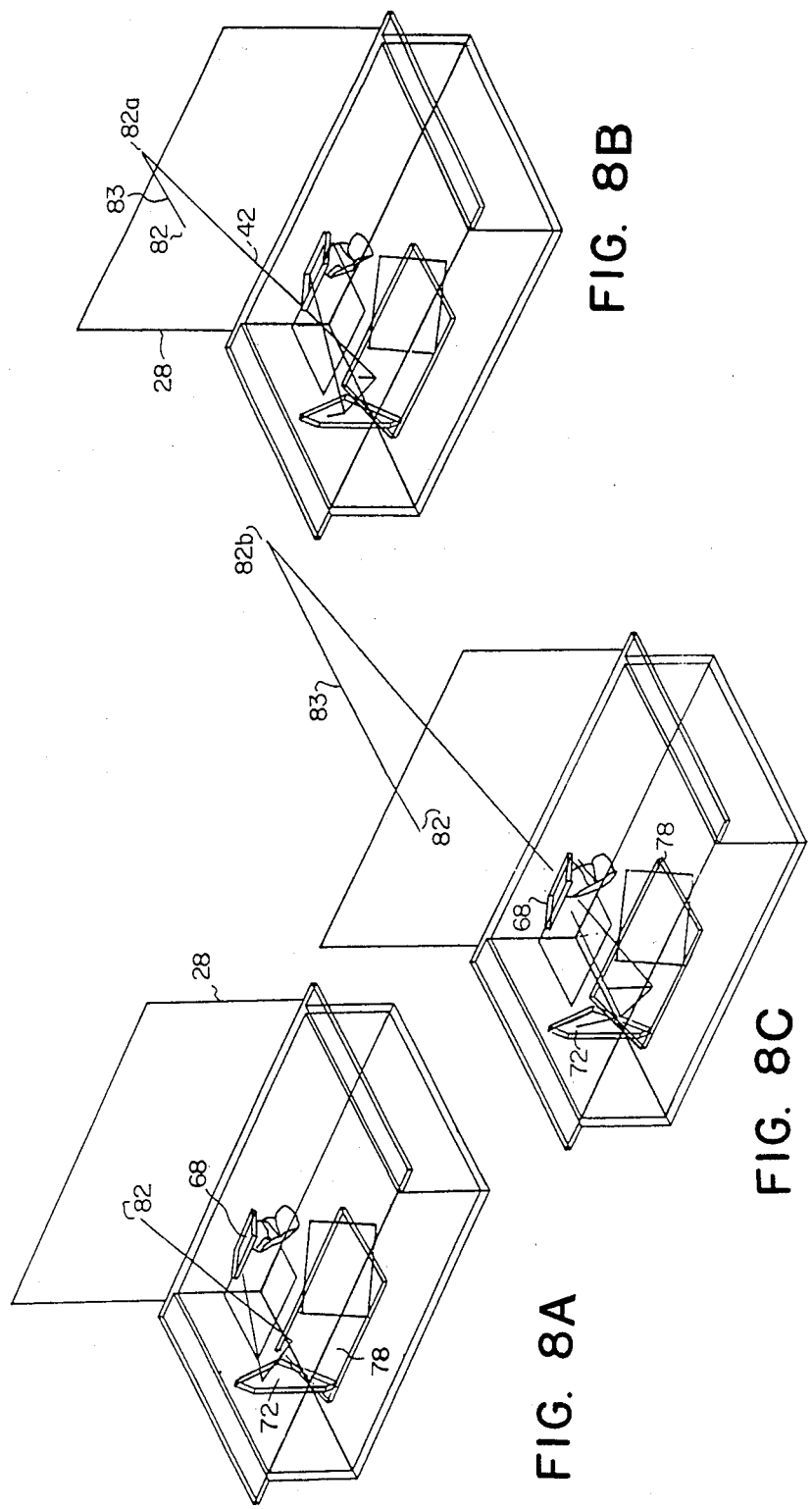

SHALLOW BAR CODE SCANNER

BACKGROUND OF THE INVENTION

The invention relates to bar code reading apparatus, and particularly to a counter-type bar code scanner of very shallow depth.

Point of sale (POS) bar code scanners, such as those now commonly used in grocery stores and other retail stores, have certain basic requirements. The POS systems generally require a scanner to provide "omnidirectional" bar code read capability. In most cases scanners cannot read a label from any random orientation, but they do come very close if it is assumed that the label is moving in one general direction toward and over the scanner.

"Omnidirectional" in this context means that generally all possible label orientations in three-dimensional space can be read within some depth of field in a scan volume above the counter top or deck, assuming the packages are always coming from the same general direction. The actual field of reading generally is about 140°, about an axis perpendicular to the scanner top.

Almost all POS supermarket bar code scanners have conventionally used a similar scan pattern. This basic scan pattern can be defined by a series of separate apparent source locations, or locations from which a scan line appears to originate. Each apparent source can be multiplied and modified slightly, depending on the number of facets (on a mirror or a holographic deflector) used to generate a line or lines coming from the same general location. Different facets can produce scan lines which are slightly offset from one another, so these may technically be an integral multiple of the basic apparent sources. Most contemporary scanners produce scan lines based on five general apparent sources, with some variation in the pattern. These sources are termed the center horizontal, the left and right side horizontals, and the left and right verticals. Substantially all scanners currently in use employ some variation of this five apparent source pattern. Some scanners may produce four center horizontals, others may produce one center horizontal, etc., depending on the intended usage of the scanner and the skill of the designer.

The basic five apparent source scan pattern has evolved as a very efficient and elegant scan pattern for providing "omnidirectional" read capability for labels. However, several criteria well known in the art of POS scanner design have led those skilled in the art to believe it to be very difficult or impossible to create this type of scan pattern in a shallow package, such as about 12 cm in height.

One problem seen with reference to the prior art is that a vertical scan line generally must travel along a mirror inclined along the height of the package. Thus, the amount of usable vertical scan line is a function of package height. Accordingly, in the prior art a tall vertically-oriented mirror tended to be the final mirror which reflected the beam out of the scanner.

Another restriction in scanner design, relating to producing a shallow scanner, is the distance the scanning beam travels from mirror to mirror inside the scanner before it exits. This relates to the fact that a laser scanner requires a certain beam size, within certain narrow limitations, at all reading positions in the scan volume above the deck. Since the scanner contains only one set of optics for focusing the beam, which converges as it exits the scanner, all scan lines must generally have about the same distance to the counter top. The addition of more mirrors to make a scan line will increase the path length and will affect usable depth of field above the counter top. As more mirrors are added, the scanner designer must also be careful that he has not reduced mirror sizes to the extent of blocking the light collected from the bar code.

Prior art scan patterns generally were based on early work by IBM and RCA as to codes and scan line orientations that could be used to reduce sensitivity to orientation. Scanner manufacturers thus attempted to produce lines going through space which would give the best possible area coverage and volume coverage as the label was moved through the scan volume.

Some early scanners were as much as three feet high, generating a scan pattern called a stitch bar pattern, essentially an orthogonal grid. There was also a theory that a scan pattern could be configured generally as a series of orthogonally intersecting diagonals, i.e., a series of Xs. Further, according to another theory three scan lines could intersect at 60° angles, in an asterisk-like pattern, for further redundancy in assuring readings.

Most of the early theory for design of scan pattern for multiple coverage of bar codes was developed in two dimensions. The bar code generally is set up in what is called an over-square condition. In this configuration the height of the bars on the label is greater than half the width of the bar pattern. Typically the ratio of the height to half the width is about 1½:1 to 2:1. The UPC (Uniform Product Code) label is configured so that if one half of the label is read, then the other half is read, and the two readings are put together, all of the information is retrieved. Thus, a scan line need not traverse all the bars of the bar code, but only half the bars, with another scan line traversing the other half.

In designing the scan lines of a bar code scanner as seen by a label passing through a scan volume above the deck, it is necessary for "omnidirectional" read capability to have at least one scan line able to traverse half the bars of the bar code label, regardless of the orientation of the package and the label, assuming the package is moving in one direction over the scanner within predefined velocity limits. In an ideal scan geometry, no matter what orientation the package is in, the bar code label would always "see" what appear to be orthogonally crossing lines.

In a laser scanner a laser tube somewhere in the scanner package generates a beam which is routed around to a lens and then goes toward a rotating wheel. The rotating wheel may comprise a polygon, i.e., a mirror wheel with two or three mirror surfaces on a polygon which rotates, or it may comprise a hologram. In either event, the beam emerges from the rotating wheel and then it is reflected off a series of successive mirrors to exit the scanner creating a scan pattern in a scan volume above the deck of the scanner.

One concern in scanner geometry and optics design is path length. The paths of all the scan lines should generally be about the same, since the scanned laser beam is a converging one, and it has a limited depth of field wherein the spot size will be small enough in relation to a bar code label to be able to accurately distinguish the bars and spaces. Thus, if one scan line has a considerably greater path length than another, the degree of convergence of the beam in that scan line will be different from the convergence in another scan line at a given point in space, leading to excessive differences in spot size on the two scan lines.

In certain markets, particularly in European POS scanners such as in grocery stores, there is a need for a counter top scanner of considerably shallower total depth than has been available previously, to enable cashiers to sit down comfortably with their legs beneath the scanner package. This problem has been addressed in the prior art, but in ways which have generally not been acceptable. There have been some systems wherein a relatively shallow scanner height, of about 16 cm for example, has been achieved. This is generally not sufficient since a standard or usual requirement is that the scanner be less than about 13 cm deep for comfort of the cashier.

Another prior art approach has been to have a deck and associated scanner package which is of relatively shallow depth, but with a portion of the housing expending up considerably higher, and that portion including some operative components such as a holographic optical element. Still another approach has been to have the deck area of the machine quite shallow, on the order of about 10 cm, but with an obliquely upwardly extending housing portion at one side of the machine, and with the oblique portion actually having the scanned beam outlet window. This requires the cashier to orient the bar code away from himself when sitting down, making difficult the proper orientation of the bar code since it is not then seen by the cashier. It is also a more awkward approach to moving a product through a scan volume, since the scan volume is actually raised and tilted with respect to the counter top.

It is among the objects of the present invention to provide a bar code scanner of shallow profile, less than 13 cm, with five-apparent-source scan geometry or similar and with the scan volume immediately above a horizontal deck as in the typical preferred configuration, and with a high degree of reading reliability.

SUMMARY OF THE INVENTION

In accordance with the present invention, a low-profile POS laser scanner, for reading bar codes positioned within a scan volume above the scanner, includes a housing of shallow profile height, no more than about 13 cm in height, and optimally with a height of about 11.5 cm. Preferably a flat, smooth and flush deck comprises the top surface of the scanner.

The scanner housing includes a laser and optical means, including a plurality of mirrors, for producing a five-apparent source scan geometry within an optimum scan volume above the deck. The scan geometry includes a center horizontal scan line, two side horizontal scan lines and two generally vertical scan lines, all generated within scanning planes at different angular orientations, intersecting generally orthogonally, and produced within the confines of the shallow profile height of the housing. The system is retrodirective, receiving collected light along the same path taken by the scanned beam.

This is achieved in accordance with the invention with a rotating polygon mirror preferably having three mirror facets and with its spindle axis oriented approximately horizontally, actually tilted downwardly somewhat from horizontal in the direction of the approaching laser beam. For each scan line, the beam is reflected from three mirrors after the rotating polygon mirror, before exiting the scanner. Preferably a total of seven mirrors are included in the scanner. Generally, in comparison with contemporary prior art scanner designs, some principal differences are the addition of an extra reflecting surface in the scan path, and the location and orientation of the polygon mirror and its axis. However, in combination with these features are the size, shape, orientation and location of each fixed mirror, as well as other factors.

The scanner of the invention preferably employs a three-faceted prismoidal or rotating mirror, which has the effect of increasing scanning repetition rate as compared to a two-faceted rotating mirror, assuming similar rpm. This helps assure a reliable bar code reading and also helps comply with safety requirements.

The scanner apparatus of the invention preferably employs a bifocal lens as part of the internal optics, just upstream of the rotating polygon mirror for the incident laser beam and just downstream of the polygon mirror with respect to receiving collected light from the bar code along the retrodirective path. The bifocal lens comprises a small convex lens for focusing the outgoing beam, built into a much larger convex lens for collecting the reflected light from the bar code and concentrating it toward a detector.

Also in accordance with the invention, generally the same path length for all scan lines is achieved by the optics of the system. Therefore, within the optimum scan volume above the scanner housing, a consistent depth of an acceptable focus is achieved, and a bifocal lens of desirable fixed focal length can be used.

A flat top deck surface is an important feature of the scanner of the invention, without protrusions or contoured slots. Preferably, the scan lines pass through a window assembly which is flush with the remainder of the counter top and scanner deck. The outer surface of a glass top window of the assembly may be coated with tin oxide, for resistance against scratching.

Another feature of the invention is that the laser within the system preferably includes a diverging lens which actually comprises part of the beam forming optics of the scanner system.

The mirror optics of the scanner include the preferably three-faceted rotating polygon mirror; a folding mirror positioned in roof-like arrangement in oblique but left-right symmetrical orientation above the rotating polygon mirror; and left and right vertical mirrors, on either side of the polygon mirror, adjacent to the folding mirror above, oriented obliquely toward the polygon mirror in both vertical and horizontal directions. These three mirrors are immediately adjacent to the rotating polygon mirror. They are positioned adjacent to an end of the scanner housing which faces the direction from which the moving products approach the scan volume, i.e. at the upstream end of the housing.

Toward an opposite end of the scanner housing, opposite the three mirrors just described, are four additional mirrors which receive the scanning beam from the first three to output the final scan lines. These four mirrors include a center horizontal mirror which is tilted downwardly but generally faces the folding mirror (i.e. with left-right symmetry); left and right pattern mirrors which extend wing-like on either side of the center horizontal mirror, tilted downwardly and inwardly; and a large bottom mirror or final routing mirror, which serves as the final reflecting surface for all five scan lines generated by the system.

In the sweep of one facet of the rotating polygon mirror, the laser beam reflecting from the moving mirror facet first strikes the left vertical mirror, adjacent to the polygon mirror, and is reflected diagonally across the inside of the scanner to the right pattern mirror. There it is reflected obliquely downwardly generally in a vertical fan or plane to the final routing mirror, which reflects the scanning beam as a generally vertical fan out of the scanner, forming the left vertical scan line.

As the facet of the polygon advances, the beam moves in a sweeping arc and jumps off the left vertical mirror and moves onto the folding mirror, the roof-like mirror centered above the polygon. In the first part of the beam's traversal across the folding mirror (in the left portion of the folding mirror), the beam is reflected off the folding mirror to move directly across the scanner to the left pattern mirror, where it is reflected down to the final routing mirror in a diagonal direction to form a sweeping path that is generally parallel to the top edge of the pattern mirror, creating the right side horizontal scan line as the scanning beam emerges from the scanner.

The sweeping beam from the facet of the rotating polygon mirror continues its traversal along the folding mirror. When it approaches a central area of the folding mirror the beam completes the side horizontal scan line, and moves from the pattern mirror to the center horizontal mirror, adjacent to the pattern mirror. This mirror reflects the beam down to the final routing mirror, up and out of the housing to create the center horizontal scan line.

The process of movement of the mirror facet and the sweeping beam continues, producing the left side horizontal (via the right pattern mirror) and the right vertical scan line (via the left pattern mirror).

It is a principal object of the invention to achieve a bar code POS type scanner of very shallow profile, capable of efficiently and reliably reading bar codes on moving articles, using a different arrangement of optical components from those in the prior art.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 4 shows in general the pattern of a scanning beam as it leaves a three-faceted rotating polygon mirror and is reflected by three fixed mirrors to form one of a pair of vertical scan lines.

FIGS. 7A through 7F are schematic views in perspective and in side elevation, showing the beginning, middle and end of the generation of the left vertical scan line, in the beginning portion in the beam's reflection off one of the facets of the rotating polygon mirror.

FIGS. 8A through 8C are similar to FIGS. 7A, 7C and 7E, and indicate generally the beginning, middle and end of the scanning sequence that forms one of the pair of side horizontal scan lines.

DESCRIPTION OF PREFERRED EMBODIMENT

Figure 1:
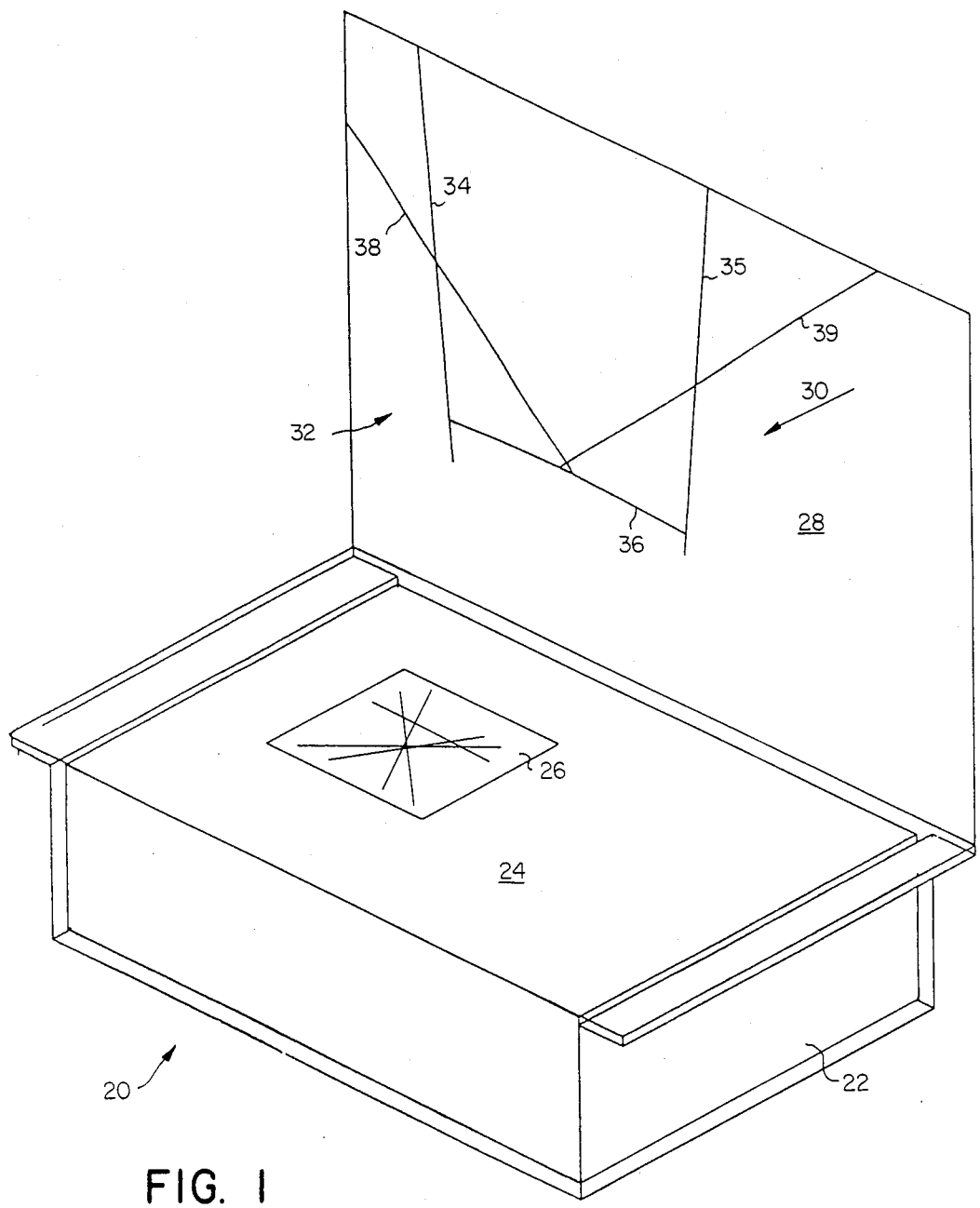
FIG. 1 is an exterior view of a shallow profile bar code scanner apparatus in accordance with the invention, with the five-apparent-source scan pattern shown as it projects on a vertical plane in the position of a product moving over the scanner.

In the drawings, FIG. 1 shows a shallow profile POS bar code reader scanning apparatus 20 in accordance with the invention, including a housing or cabinet 22, and a top deck 24 with a window 26 for emergence of the bar code reading beam and for return of collected light from the bar code. In FIG. 1 a planar card or piece of paper 28 is shown in generally vertical orientation held in the position a retail product may take as it is advanced over the deck 24 of the scanner 20, the movement of the product over the deck being in the direction of the arrow 30 in FIG. 1. On the card or paper 28 is shown a laser beam scan pattern 32 of five-apparent-source geometry which in general has been well known and preferred in POS counter top scanners.

The "five-apparent-source" scan pattern 32 includes five scan lines which emerge from the window 26 as planar fans of the scanned beam, but which would appear generally as shown on a vertical transverse projection surface 28 as in FIG. 1. The five lines of the pattern 32 include a left vertical 34, a right vertical 35, a center horizontal 36, a left side horizontal 38 and a right side horizontal 39. As seen in FIG. 1, these five scan lines of the pattern 32 include a number of generally orthogonal intersections, which are advantageous in assuring that a reading of a bar code label will be completed.

Figure 2:
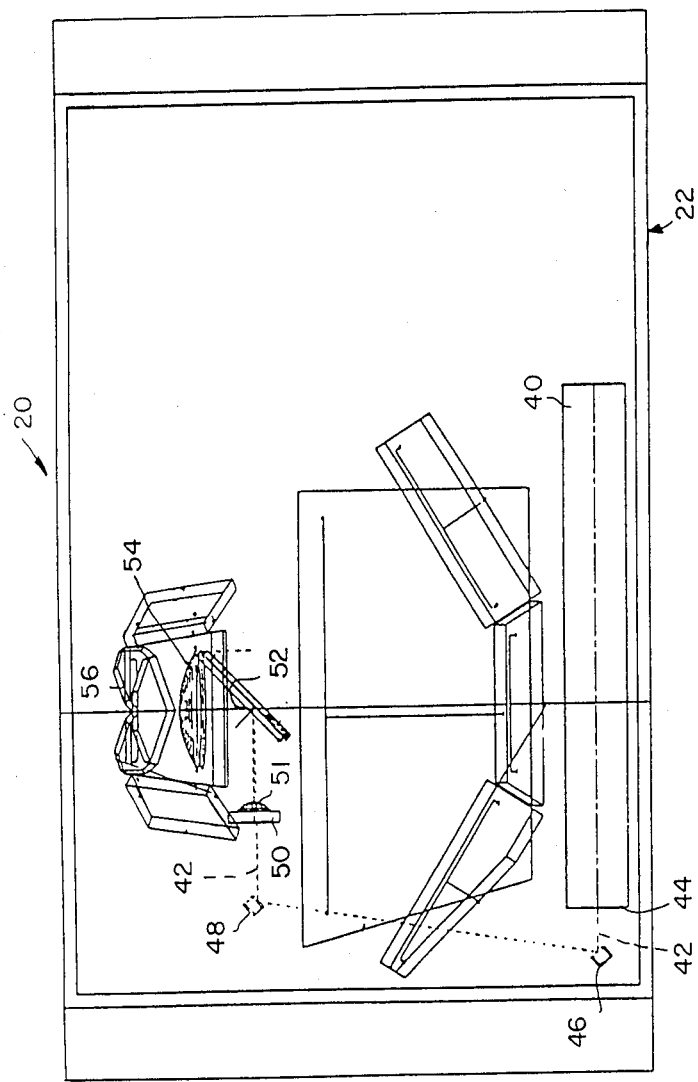
FIG. 2 is a plan view of the scanner apparatus, with the top deck removed.

FIG. 2 shows the scanner apparatus 20 in plan view, with the deck 24 removed. As indicated in FIG. 2, the assembly includes a laser 40, which may be a helium-neon laser or other tube type laser or other non-tube type laser, and this may be positioned in the housing 22 at a back end or trailing end of the housing, as far as the direction of product movement is concerned. The laser 40 outputs a beam 42 from an output end 44, and this may be directed by two mirrors 46 and 48 toward the leading end of the housing or cabinet 22. The beam 42, after being reflected off the mirror 48, preferably passes around or above (as shown in FIG. 2) a photodetector 50, and meniscus lens 51, then reflects off a collection mirror 52 positioned approximately at 45°, with a normal to the mirror slightly upward and thence through a special lens 54 which may be a bifocal lens, and then impinges on a three-faceted rotating mirror 56.

Herein and in the claims, "five-apparent-source" is intended to refer to five general apparent sources, even though a given scan line generated by one facet of the polygon mirror 56 may be displaced slightly with respect to the same scan line as generated by a different facet, which technically could result in 15 apparent sources rather than five.

Figure 3:
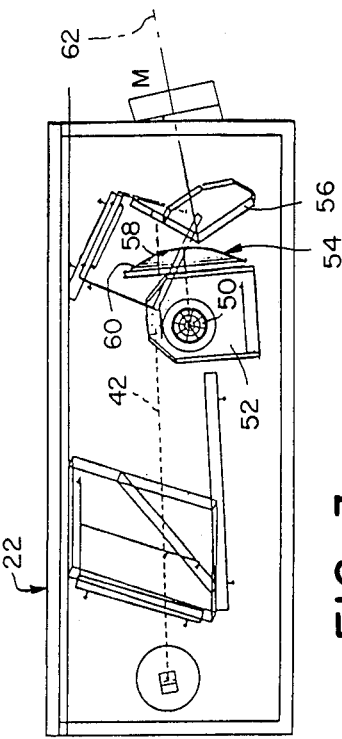
FIG. 3 is a sectional elevation view of the scanner apparatus of the invention, from one side.
Figure 10B:
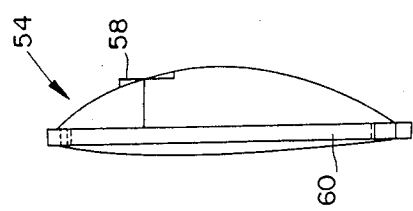
FIGS. 10A and 10B are an elevation view showing a bifocal lens used in the system of the invention, positioned adjacent to the rotating polygon mirror as shown in FIGS. 2 and 3.
Figure 10A:
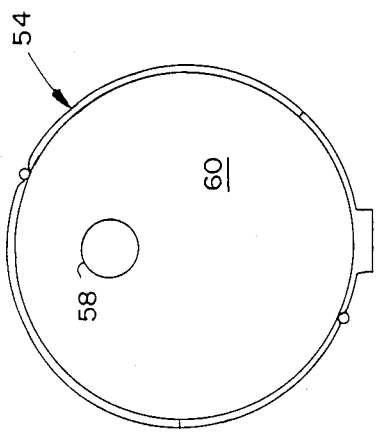

The bifocal lens 54 is shown in FIGS. 2 and 3, and also in FIGS. 10A and 10B. It includes two lens elements: a first, small convex lens element 58 for helping converge the laser beam 42 on its path toward the rotating polygon mirror 56; and a second large convex lens element 60 essentially the size of the entire bifocal lens 54, for re-focusing the returning collected light from a bar code after it has been reflected back by the rotating polygon mirror 56 as a relatively large-volume, diverging beam. The small lens 58 is built into the large lens 60. The large lens element 60 focuses the large volume beam toward the photodetector 50, with the angled collection mirror 52 reflecting the returning collected beam from the lens 60 toward the photodetector 50. As indicated in the drawings, particularly FIG. 3, the rotating polygon mirror 56 rotates about an axis 62 which is oriented on a slightly downward tilt into the housing 22. The downward tilt angle may be, in this preferred embodiment, approximately 11° from horizontal.

As also shown in FIG. 2 and 3 the laser beam 42 approaches the rotating polygon mirror 56 at a slightly upward inclination, not necessarily parallel to the axis 62 of the rotating polygon mirror. Preferably, the tilt of the approaching beam from horizontal (through the lens 58) is less than that of the rotating mirror, and may be about 2.8° from horizontal. The tilt of the axis of the large lens 60 of the bifocal lens 54 may be about 4.5° from horizontal.

The beam 42 passes through the small convex lens element 58 of the bifocal mirror 54 in accordance with the invention, and impinges on one of three facets of the rotating polygon mirror 56 at a position above the center of the rotating polygon mirror and which may be at a level about half way up between the rotating mirror axis and the upper edge of the particular facet, so that the beam sweeps across generally a maximum possible length on the mirror facet.

As indicated in the drawings, the rotating polygon mirror 56 is rotationally driven by a motor 62 which may be mounted on the outside of the housing 22, and which may rotate the polygon mirror 56 at about 6000 RPM. As discussed above the speed of rotation of the polygon mirror 56 determines the repetition rate of the scan pattern, each facet of the polygon mirror 56 producing all five scan lines in its sweep across the entering laser beam 42.

In this preferred embodiment, the angle of each mirror facet of the rotating polygon mirror may be about 50° to the axis of rotation of the mirror.

Figure 4:
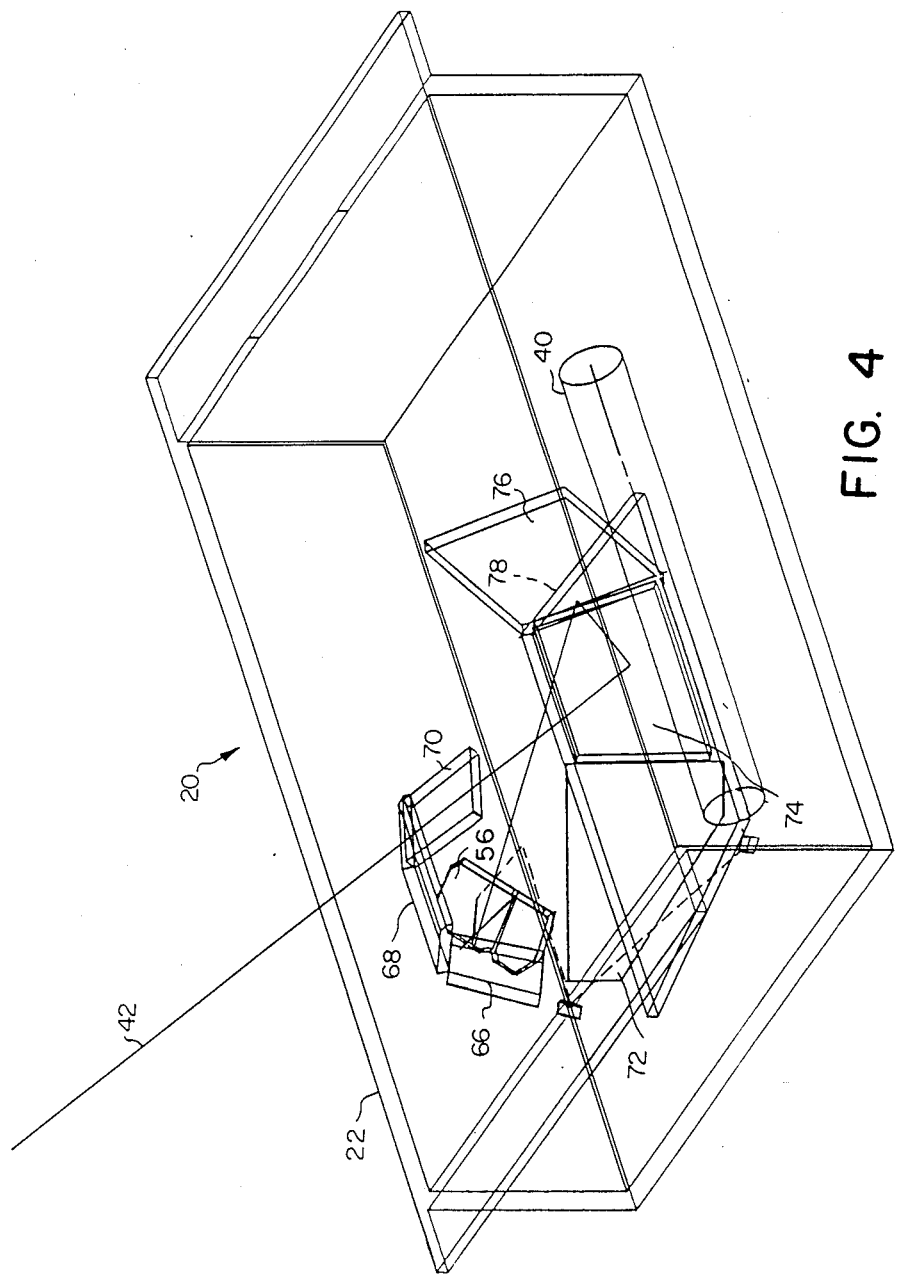
FIG. 4 is a perspective view of the scanner apparatus, shown somewhat schematically with the top deck removed and with certain components removed for clarity.

FIG. 4 shows the scanner 20 in perspective, with the top deck removed, and reveals further the position and orientation of a series of fixed scanning mirrors which direct the laser beam from the rotating polygon mirror 56 through preferably three subsequent reflections and out of the scanner housing 22 into the scan volume above. A number of elements are omitted from FIG. 4 for clarity. These mirrors include three mirrors adjacent to the rotating polygon mirror, i.e. a left vertical mirror 66 to the left of the polygon mirror 56 and angled obliquely outwardly and inwardly/downwardly with respect to the polygon mirror; a folding mirror 68 in roof-like position over the polygon mirror 56 angled upwardly and outwardly with respect to the position of the polygon mirror; and a right vertical mirror 70 on the other side of the polygon mirror from the left vertical mirror 66, and oriented opposite hand with respect to the left vertical mirror.

There are four additional scanning mirrors in the housing 22 toward the trailing end of the housing with respect to the direction of product travel: a left pattern mirror 72 which is angled obliquely outwardly and tilted somewhat inwardly/downwardly in the housing as illustrated, a center horizontal mirror 74 which is tilted somewhat inwardly/downwardly in the housing and which is shallow in height but elongated as shown in FIG. 4, since it receives a horizontally sweeping beam; and a right pattern mirror 76, which is oriented opposite hand to the left pattern mirror 72, so that the two pattern mirrors are arranged generally wing-like on either side of the center horizontal mirror 74.

Below these latter three mirrors is a large generally horizontal mirror or final routing mirror 78, which is the final reflective surface from which all scan lines emerge from the scanner 20. FIG. 4 shows generally the path of the laser beam 42 as it reflects off the active facet of the rotating polygon mirror 56 to form the left vertical scan line of the scan pattern. As seen in FIG. 4, the beam 42 is reflected from the active mirror facet to the surface of the left vertical mirror 66, on which it moves upwardly along a sweeping path. One position of the beam is shown in FIG. 4, with the beam incident on the left vertical mirror 66 and reflected generally diagonally across the housing space to the right pattern mirror 76. There, it is reflected downwardly onto the surface of the final routing mirror 78, and is reflected, somewhat obliquely upwardly and out of the scanner 20 through the deck window (not shown in Fig. 4). The scanning beam in its sweeping path up the left vertical mirror 66 will form an emerging plane or fan of scan.

Figure 5:
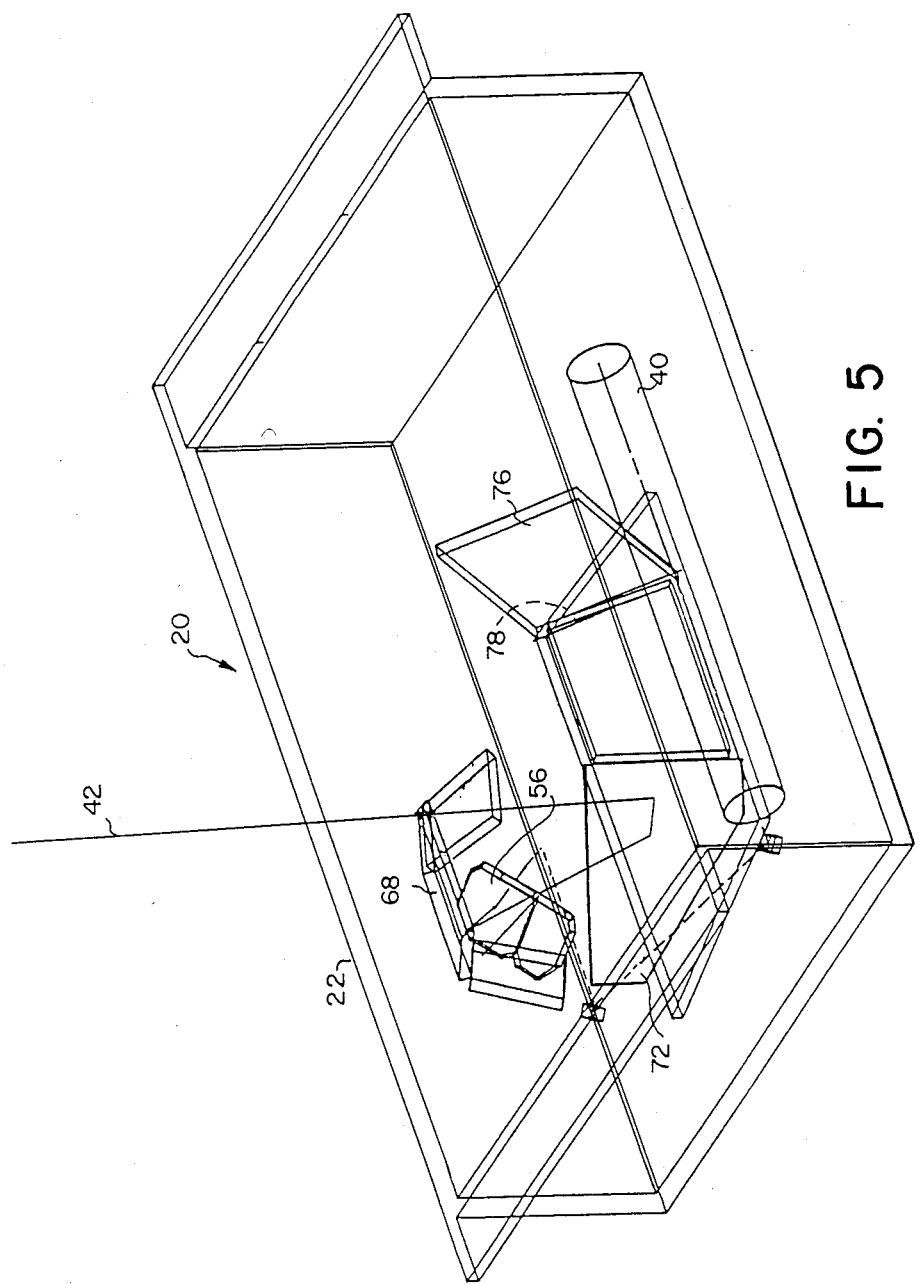
FIG. 5 is a view similar to FIG. 4, but showing the beam from the rotating polygon mirror in a different portion of its path, reflected off fixed mirrors to form one of a pair of side horizontal scan lines.

FIG. 5 is similar to FIG. 4, but shows the beam 42 in a position wherein the rotating polygon mirror 56 has swept the reflected beam up to a position of incidence on the folding mirror 68 above. The beam as reflected off the folding mirror 68 now travels in a very different path, now directly crossing the housing space to the left pattern mirror 72. There the beam is reflected down onto the final routing mirror 78 and emerges from the scanner 20 to form the right side horizontal scan line.

The sweeping beam reflected from the rotating polygon mirror 56 continues to scan on a left portion of the folding mirror 68 (as seen looking at the polygon mirror from inside the housing) to form the complete right side horizontal scan line.

As the scanning beam 42 from the polygon mirror 56 approaches a central area of the folding mirror 68, it moves off the left pattern mirror 72 at the other end of the housing and onto the center horizontal mirror 74. This begins the generation of the center horizontal scan line, which is indicated schematically in FIG. 6, with the beam 42 shown in one position of that scan line.

The scanning of the beam 42 from the same active facet continues, next forming the left side horizontal scan line as the beam completes its movement across the folding mirror 68 and moves across a portion of the right pattern mirror 76, and finally forming the right vertical scan line as the beam is scanned by the mirror facet down the right vertical mirror 70 and over the diagonally opposite left pattern mirror 72.

FIGS. 7A through 9C indicate schematically the start, middle and finish of each of the left vertical scan line, the right side horizontal scan line, and the center horizontal scan line, respectively. These perspective views show the path of the beam from the active facet of the rotating polygon mirror through three succeeding reflections off fixed mirrors to the projection of the scan line on a generally vertical planar projection surface 28 as positioned in the path of product movement generally at the beginning of the scan volume over the scanner 20. In these views the rotating polygon mirror itself, as well as the laser and initial mirrors and lenses, are not shown.

Figure 7F:
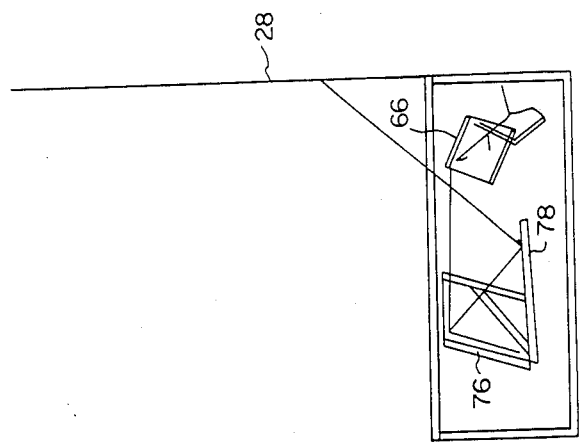

FIGS. 7A-7F show the scanning beam 42 as reflected off the rotating polygon mirror (not shown) and incident on the left vertical mirror 66. FIGS. 7A and 7B show generally the position of the scanning beam 42 at the very beginning of the sweep of the active facet of the rotating polygon mirror. Thus, FIGS. 7A and 7B show generally the path of the beam as it leaves the first part of the active facet surface and strikes the left vertical mirror near its bottom, then travels generally diagonally across to the right pattern mirror 76 and reflects off the final routing mirror 78. The beam travels out of the scanner through the window 26, indicated schematically, to define the beginning point 80 of the left vertical scan line. FIGS. 7A and 7B illustrate the beginning of the left vertical scan line as it would be projected on (or above) the vertical projection surface 28, and the point 80 is the uppermost point of the left vertical scan line as seen on that vertical plane (the projection surface 28 is limited in height to that of the active scan volume).

FIGS. 7C and 7D show the scanning beam as it would be positioned at about the middle of the left vertical scan line in this preferred embodiment. Here, the reflected beam leaving the surface of the rotating polygon mirror has moved up higher on the left vertical mirror and now reflects across to strike the right pattern mirror at a higher level. Accordingly, the beam as reflected off the final routing mirror 78 at the bottom of the housing will strike the projection surface 28 at a lower level, i.e. at the point 80a, forming the scan line 81. FIGS. 7C and 7D indicate traced paths of the scanned beam on the right pattern mirror 76 and on the final routing mirror 78.

Figure 7E:
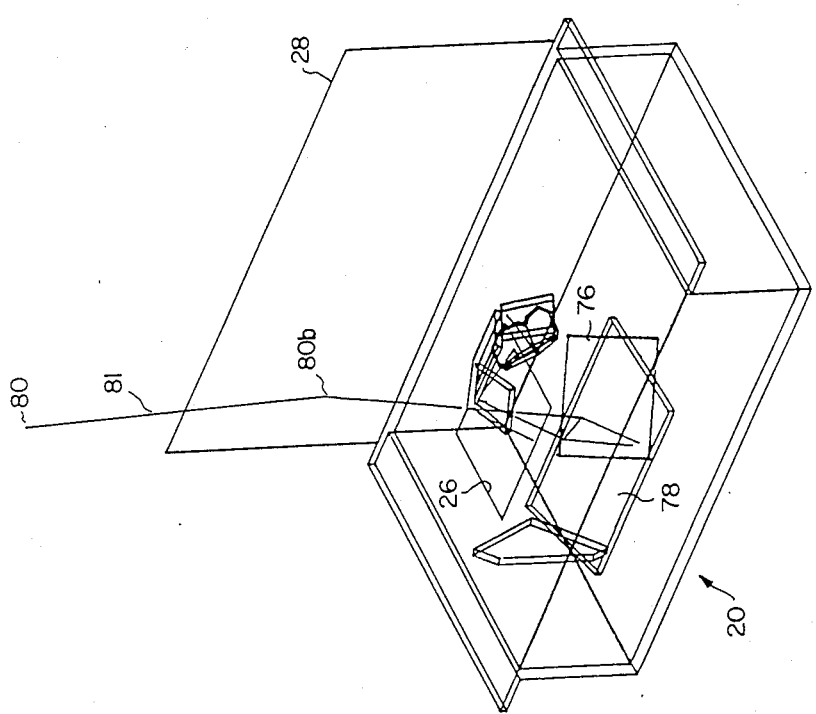

FIGS. 7E and 7F show the scanned beam 42 at the completion of the left vertical scan line 81, with the beam now at the top edge of the left vertical mirror 66 and at the top edge of the right pattern mirror 76 (again, the traced pattern is shown on the mirrors 76 and 78). The beam is at an end point 80b of the scan line 81 on the vertical projection surface 28.

FIGS. 8A, 8B and 8C show beginning, intermediate and end points 82, 82a and 82b of the generation of the right side horizontal scan line 83, corresponding generally to what is shown in FIG. 5. In FIG. 8A, the beam leaving the active facet of the rotating polygon mirror has just swept off the left vertical mirror and has reached the left edge of the folding mirror 68, which reflects the beam across to the left pattern mirror 72. From there the beam is reflected off the final routing mirror 78 to form the beginning point 82 of the right side horizontal scan line 83, shown as projecting onto the vertical projection surface 28. These side horizontal scan lines on such a transverse vertical planar projection surface 28 will appear oblique, as shown in FIG. 1 and indicated in FIGS. 8A through 8C. The scanning fan would form a horizontal line on a vertical plane positioned approximately 45° around to the side.

FIG. 8B shows the scanning beam 42 at an intermediate point 82a in the scan line 83, now projecting above the projection surface 28 representing the height of the active scan volume.

FIG. 8C shows the position of the beam in the completion of the right side horizontal scan line 83. The rotating polygon mirror has rotated its active facet to the point that the sweeping reflected beam has moved from the edge of the folding mirror 68 to a position approaching the center of the folding mirror, and the position of the beam on the left pattern mirror 72 has changed accordingly, to generate the scan line 83 as indicated. Again, the paths of the beam 42 are traced on the left pattern mirror and on the final routing mirror 78 in Fig. 8B and 8C.

Figure 6:
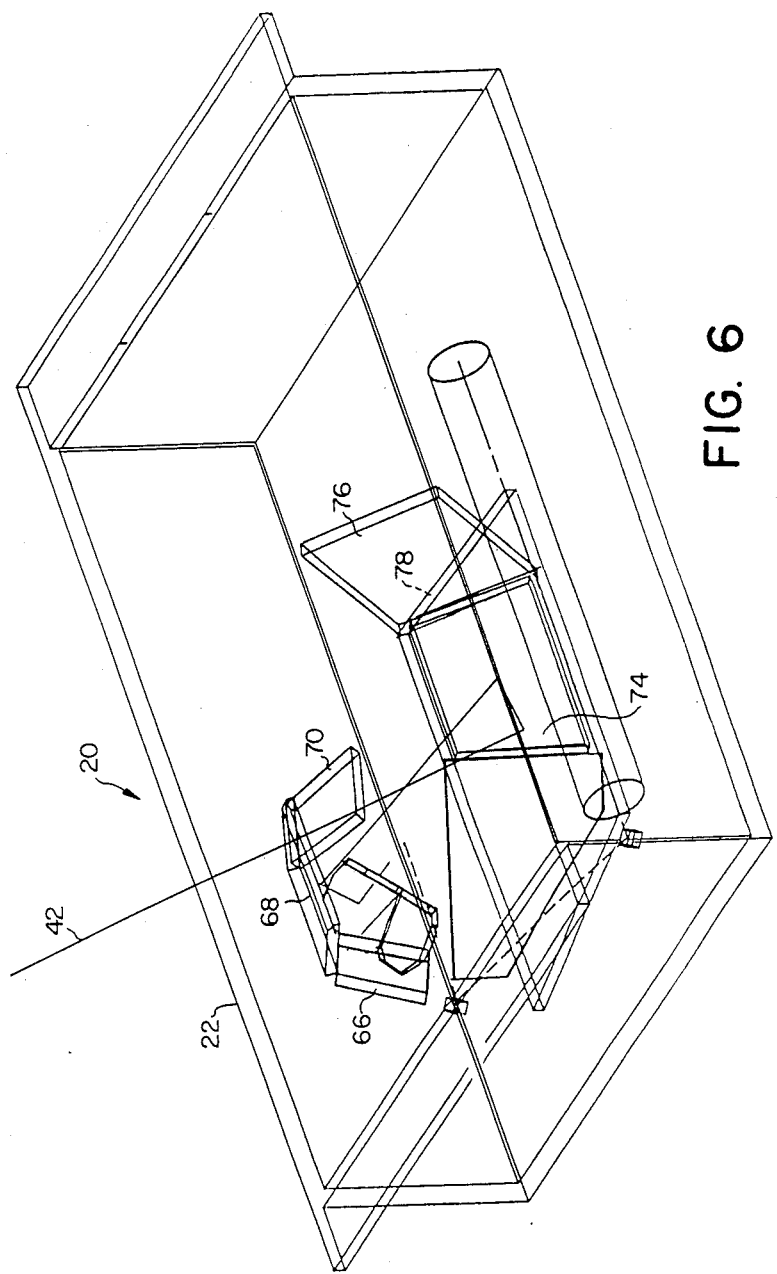
FIG. 6 is another view similar to FIG. 4, but showing the beam in another portion of its sweeping path from the rotating polygon mirror, reflected off three fixed mirrors to form the center horizontal scan line.
Figure 9B:
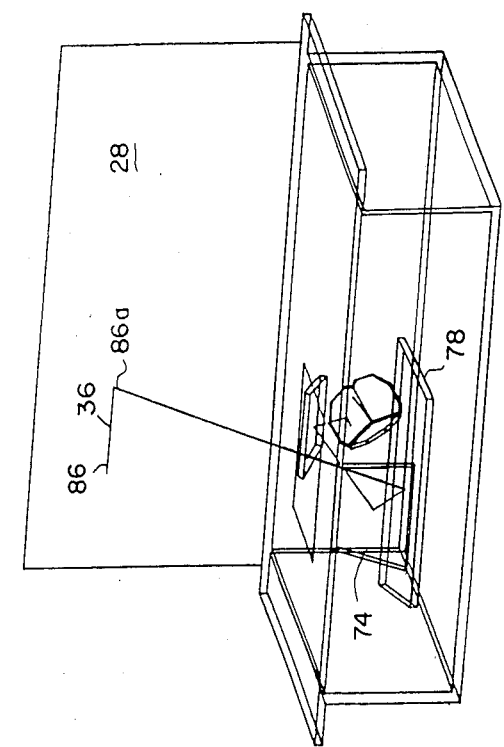
FIGS. 9A through 9C are again similar to FIGS. 7A, 7C and 7E, and show the beginning, middle and end of the scan portion which forms the center horizontal scan line.
Figure 9C:
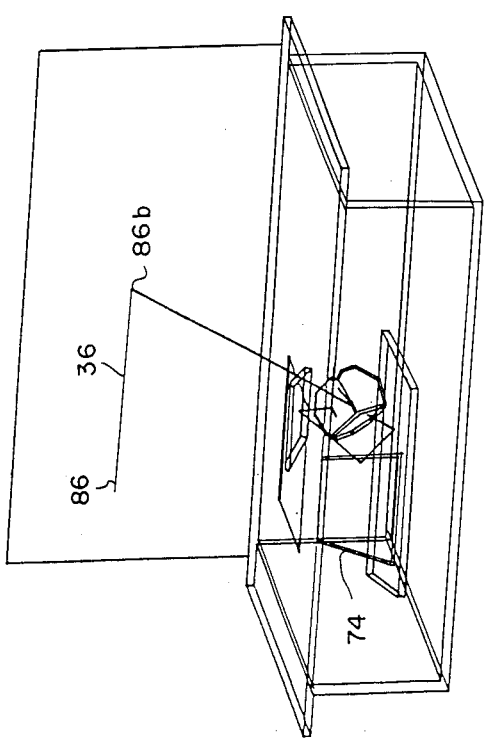
Figure 9A:
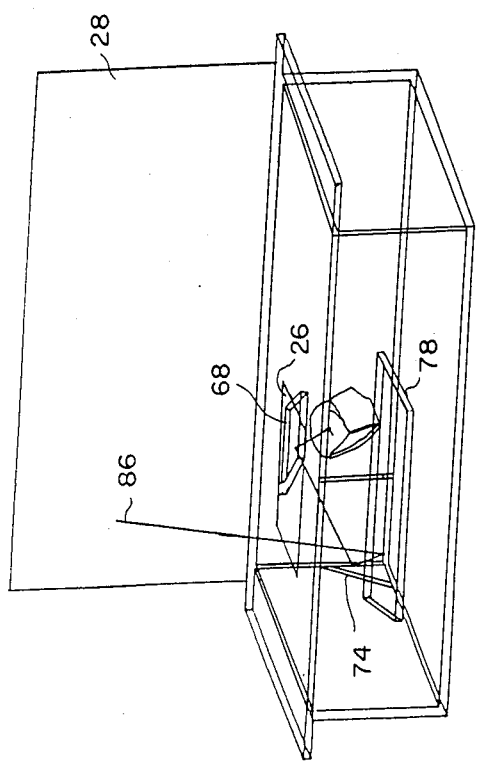

FIGS. 9A through 9C show the generation of the center horizontal scan line 36, corresponding generally to FIG. 6. In FIG. 9A the beam 42 as reflected off the rotating polygon mirror is shown at the position of the beginning point 86 of the horizontal scan line, with the beam striking the folding mirror 68 at a position essentially the same, and only slightly different from, the position shown in FIG. 8C, i.e. the position for the end point of the right side horizontal scan line. Here, in FIG. 9A, the beam has moved from the surface of the left pattern mirror and onto the beginning edge of the surface of the center horizontal mirror 74, then reflecting off the routing mirror 78 and out the deck window 26.

In FIG. 9B the beam from the polygon mirror has progressed across a central area of the folding mirror 68 and about halfway across the center horizontal mirror 74 at the other side of the housing, and is in the position of forming an intermediate point 86a of the center horizontal scan line 36 on the vertical projection surface 28.

In FIG. 9C the center horizontal line 36, is completed at an end point 86b, with the beam 42 now at the right edge of the center horizontal mirror 74.

The generation of the left side horizontal scan line and right vertical scan line are not shown, since they are similar to, but opposite hand from, what is shown in FIGS. 7A through 9C.

The fixed mirrors 66, 68, 70, 72, 74, 76 and 78 shown in these drawings, as well as the rotating polygon mirror 56 and other mirrors and lenses leading from the laser 40, may be mounted in a two-part housing construction, as disclosed in copending patent application Ser. No. 06/907,339, filed Sept. 12, 1986, assigned to the same assignee as the present invention. As described in that application, an upper housing component may support and contain the motor, the rotating polygon mirror 56, the three mirrors adjacent to the polygon mirror, i.e. the left and right vertical mirror 66 and 70 and the folding mirror 68, and three of the mirrors at the other end of the housing, i.e. the left and right pattern mirrors 72 and 76, and the center horizontal mirror 74 between them. The lower housing portion may contain and support the laser 40 itself, the three mirrors 46, 48 and 52 leading from the laser toward the polygon mirror, the bifocal lens 54, the photodetector 50 and meniscus lens 1, and the final routing mirror 78. In that co-pending application there are disclosed means for automatic alignment of all these mirrors and lenses in the system.

FIGS. 10A and 10B show the bifocal lens 54 in front elevation (as seen by the rotating polygon mirror 56) and side elevation, as discussed previously.

Figure 11:
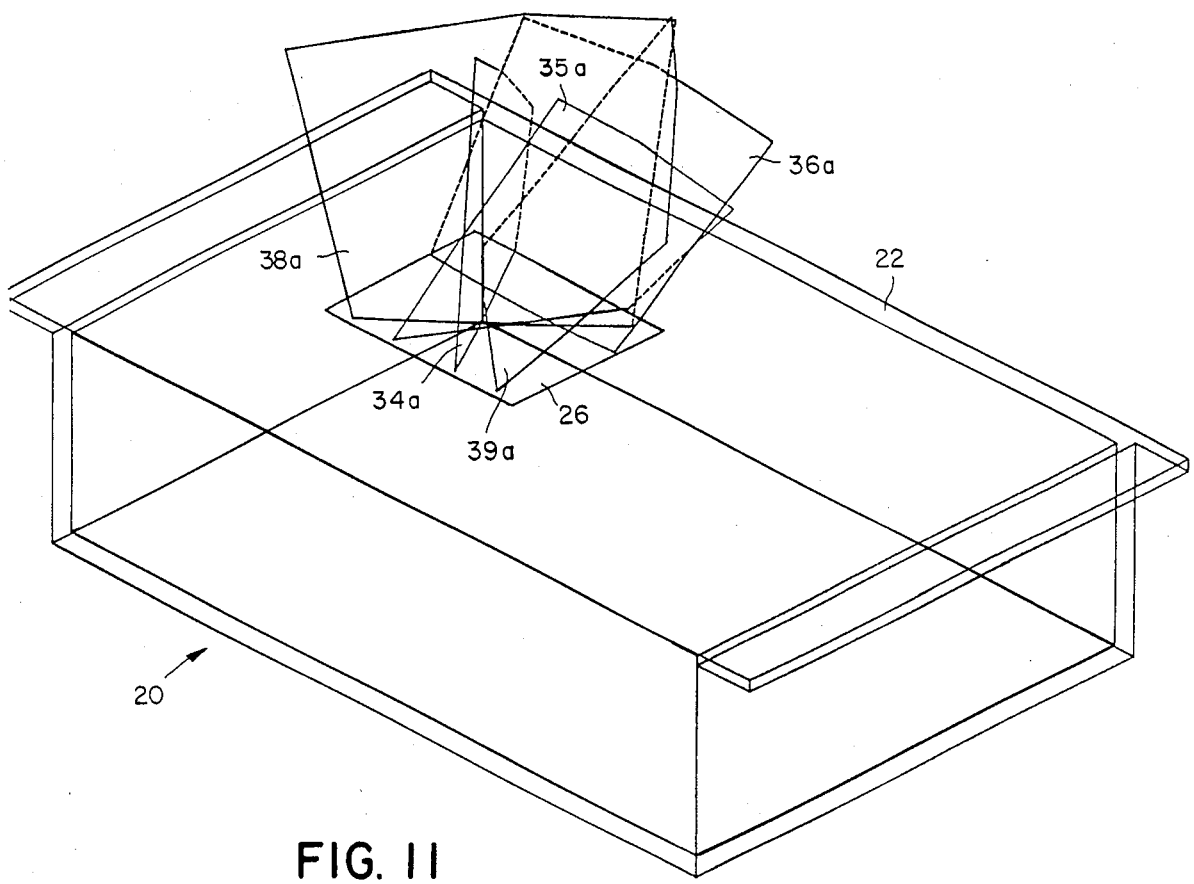
FIG. 11 is a perspective view showing scan line fans of the scanning beam generally as they would emerge from the scanner, with all the beam fans shown simultaneously, rather than sequentially as they are in reality generated.

FIG. 11 shows in perspective a series of scan line fans approximately as they would emerge from the window 26 of the laser scanner 20, were they all to emerge simultaneously. Thus, FIG. 11 shows the left and right vertical scan line fans 34a and 35a, the center horizontal scan line fan 36a, and the left and right side horizontal scan line fans 38a and 39a.

Although the description and claims herein use terms such as "up", "down", "vertical", "horizontal", "above", "below", etc., it should be understood that these terms are used only for convenience in referring to the drawing, and the illustrated and described scanner could be installed and used in any desired orientation. Thus, these terms are to be considered relative and not limiting of the scope of the invention or claims.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A low-profile laser scanner for reading bar codes positioned above the scanner, comprising:
    a housing of shallow profile height, no more than about 13 cm in height, with a deck as a top surface;
    a laser in the housing producing a beam to be scanned;
    optical means within the housing, including a plurality of mirrors at least one of which is tilted downwardly to route said beam to a bottom mirror which then reflect said beam in an upward direction for producing a five-apparent-source scan geometry within an optimum scan volume above the desk, the scan geometry including a center horizontal scan line, two side horizontal scan lines and two generally vertical scan lines, all generated within scanning planes at different angular orientations, produced within the confines of the shallow profile height of the housing.

2. The laser scanner of claim 1, wherein the overall profile height of the housing is no greater than about 11.5 cm.

3. The laser scanner of claim 1, wherein the deck is substantially flat and flush.

4. The laser scanner of claim 1, wherein the deck includes a scan window which is slotless and substantially flush with the deck.

5. The laser scanner of claim 1, wherein the optical means includes a rotating polygon mirror with a rotational axis tilted approximately horizontally in the housing, and mirror means for causing the beam to be reflected three times after being reflected from the rotating polygon mirror.

6. The laser scanner of claim 5, wherein the optical means includes the following beam routing mirrors: left and right vertical mirrors on either side of the rotating polygon mirror, a folding mirror generally above the polygon mirror, left and right pattern mirrors generally across the housing from the rotating polygon mirror, a center horizontal mirror generally between the two pattern mirrors, and a final routing mirror adjacent to the bottom of the housing for receiving the reflected beam from the pattern mirrors and from the center horizontal mirror, the pattern mirrors being so positioned and oriented as to generate left and right vertical scan fans, a center horizontal scan fan and left and right side horizontal scan fans, with generally orthogonal intersections between scan fans, in the scan volume above the deck.

7. The laser scanner of claim 5, wherein the rotational axis of the rotating polygon mirror is tilted about 11° below horizontal facing into the housing.

8. The laser scanner of claim 1, wherein the optical means further includes means for generating scan lines of approximately the same path length.

9. The scanner as in claim 1 wherein said bottom mirror is substantially horizontal.

10. The scanner as in claim 9 wherein said bottom mirror is the last mirror from which said beam is reflected before exiting the housing.

11. The scanner as in claim 9 wherein the distance travelled by said beam along said bottom mirror is greater than the distance travelled along any vertically oriented mirror.

12. A bar code scanner for reading bar codes moving through a scan volume above the scanner, comprising:
    a housing having a deck and scan window at its upper surface,
    a multi-faceted rotating polygon mirror within the housing,
    a laser in the housing producing a beam to be scanned,
    means for delivering the beam from the laser to be incident on the rotating polygon mirror,
    optical beam routing mirror means for generating multiple-apparent-source scan pattern geometry in scanning fans exiting the scanner to the scan volume above the deck with three reflections of the scanning beam after reflection off the rotating polygon mirror with at least one downward reflection of the beam after it exits the rotating polygon mirror to a bottom mirror which then reflects the beam in an upward reflection.

13. The bar code scanner of claim 12, wherein the beam routing mirror means includes means for generating five-apparent source scan geometry.

14. The bar code scanner of claim 12, wherein the housing is of shallow profile height, no greater than about 13 cm.

15. The bar code scanner of claim 12, wherein the housing is no greater than about 11.5 cm. in height.

16. The bar code scanner of claim 12, wherein the deck and scan window define a substantially flat upper surface on the scanner, without protrusions or scanning slots.

17. The bar code scanner of claim 12, wherein the optical beam routing mirror means generates five-apparent-source scan pattern geometry and includes the following beam routing mirrors: left and right vertical mirrors on either side of the rotating polygon mirror, a folding mirror generally above the polygon mirror, left and right pattern mirrors generally across the housing from the rotating polygon mirror, a center horizontal mirror generally between the two pattern mirrors, and a final routing mirror adjacent to the bottom of the housing for receiving the reflected beam from the pattern mirrors and from the center horizontal mirror, the pattern mirrors being so positioned and oriented as to generate left and right vertical scan fans, a center horizontal scan fan and left and right side horizontal scan fans, with generally orthogonal intersections between scan fans, in the scan volume above the deck.

18. The bar code scanner of claim 14, wherein the rotating polygon mirror has an axis of rotation orientated slightly below horizontal into the housing.

19. The bar code scanner of claim 18, wherein the polygon mirror's axis of rotation is oriented about 11° below horizontal.

20. The bar code scanner of claim 19, wherein the polygon mirror is three-faceted, with mirror facets at about 50° to the axis of rotation.

21. The bar code scanner of claim 12, wherein the rotating polygon mirror has an axis of rotation orientated slightly below horizontal into the housing.

22. The bar code scanner of claim 12, wherein the rotating polygon mirror is three-faceted.

23. The bar code scanner of claim 22, wherein the polygon mirror's facets are at about 50° to the axis of rotation.

24. The scanner as in claim 12 wherein said downward reflection is onto a substantially horizontal mirror.

25. The scanner as in claim 24 wherein said horizontal mirror is the last mirror from which said beam is reflected before exiting the housing.

26. The scanner as in claim 24 wherein the distance travelled by said beam along said horizontal mirror is greater than the distance travelled along any vertically oriented mirror.

27. A method for generating multiple-apparent-source geometry in a bar code scanner of shallow depth, comprising:
providing a housing of shallow depth,
orienting a rotating polygon mirror with its axis approximately horizontal in the housing,
locating a laser in the housing and providing beam directing means for directing a beam from the laser to be incident on the rotating polygon mirror,
providing fixed beam routing mirrors in the housing and locating and orienting the beam routing mirrors so that the beam after being reflected off the rotating polygon mirror is reflected three times off the beam routing mirrors and reflected downward by at least one mirror to a bottom mirror which then reflects the mirror in an upward reflection before exiting the housing to form scan fans and scan lines in multiple apparent-source geometry with scan fans intersecting generally orthogonally.

28. The method of claim 27, wherein the scan geometry comprises five-apparent-source scan geometry.

29. The method of claim 27, wherein the rotating polygon mirrors axis is oriented at about 11° below horizontal into the housing.

30. The method of claim 27, wherein the depth of the housing is no greater than about 13 cm.

31. The method of claim 30, wherein the depth of the housing is about 11.5 cm.

32. The method of claim 27, further including providing a flat top deck on the housing with a slotless window which is substantially flush with the top deck.

33. The method of claim 27, wherein the multiple-apparent-source scan geometry is five-apparent-source geometry and wherein the fixed beam routing mirrors include the following mirrors: left and right vertical mirrors on either side of the rotating polygon mirror, a folding mirror generally above the polygon mirror, left and right pattern mirrors generally across the housing from the rotating polygon mirror, a center horizontal mirror generally between the two pattern mirrors, and a final routing mirror adjacent to the bottom of the housing for receiving the reflected beam from the pattern mirrors and from the center horizontal mirror, the pattern mirrors being so positioned and oriented as to generate left and right vertical scan fans, a center horizontal scan fan and left and right side horizontal scan fans, with generally orthogonal intersections between scan fans, in the scan volume above the deck.

34. A method as in claim 27 further comprising:
moving the beam along a substantially horizontal mirror a distance greater than said beam moves along any vertically oriented mirror.

* * * * *